(12) United States Patent
Kim (10) Patent No.: US 7,658,392 B2
(45) Date of Patent: Feb. 9, 2010

(54) SUSPENSION APPARATUS

(75) Inventor: Jin-uk Kim, Suseong-gu (KR)

(73) Assignee: Sungjin Machinery Co., Ltd. (KR)

( * ) Notice: Subject to any disclaimer, the term of this patent is extended or adjusted under 35 U.S.C. 154(b) by 0 days.

(21) Appl. No.: 12/279,251

(22) PCT Filed: Feb. 12, 2007

(86) PCT No.: PCT/KR2007/000744

§ 371 (c)(1),
(2), (4) Date: Aug. 13, 2008

(87) PCT Pub. No.: WO2007/094591

PCT Pub. Date: Aug. 23, 2007

(65) Prior Publication Data

US 2009/0026723 A1  Jan. 29, 2009

(30) Foreign Application Priority Data

Feb. 14, 2006  (KR) .................. 10-2006-0014226

(51) Int. Cl.
*B60G 7/00* (2006.01)

(52) U.S. Cl. ............................. 280/124.108

(58) Field of Classification Search .......... 280/124.108, 280/124.101, 124.157, 124.158, 124.161, 280/124.162, 683; 267/123, 64.17, 64.27, 267/64.28

See application file for complete search history.

(56) References Cited

U.S. PATENT DOCUMENTS

| | | | | |
|---|---|---|---|---|
| 3,050,316 A | * | 8/1962 | Behles | .................. 280/104 |
| 3,140,880 A | * | 7/1964 | Masser | ................ 280/124.108 |
| 3,966,223 A | * | 6/1976 | Carr | .................... 280/124.128 |
| 5,046,752 A | * | 9/1991 | Stephens et al. | ............ 280/678 |
| 5,346,246 A | | 9/1994 | Lander et al. | |
| 5,374,077 A | * | 12/1994 | Penzotti et al. | ............. 280/683 |
| 6,149,142 A | * | 11/2000 | Penzotti | .................... 267/64.19 |
| 6,585,276 B2 | | 7/2003 | Boucquey | |
| 2002/0020982 A1 | | 2/2002 | Boucquey | |
| 2003/0168821 A1 | * | 9/2003 | Haire | ....................... 280/5.514 |
| 2005/0056477 A1 | * | 3/2005 | Saieg et al. | ................. 180/209 |
| 2006/0066070 A1 | * | 3/2006 | Haire | .................. 280/124.157 |
| 2006/0163833 A1 | * | 7/2006 | Haire | .................. 280/124.116 |

FOREIGN PATENT DOCUMENTS

| | | |
|---|---|---|
| JP | 2002 307924 | 10/2002 |
| JP | 2004 74977 | 3/2004 |
| JP | 2005 48959 | 2/2005 |

* cited by examiner

*Primary Examiner*—Faye M. Fleming
(74) *Attorney, Agent, or Firm*—Jae Y. Park; Kile Goekjian Reed & McManus (57) ABSTRACT

Disclosed is a suspension apparatus which can be used in rear-wheel drive, front-wheel drive, or all-wheel drive type small automobiles, so as to rapidly absorb shock or vibration transmitted from wheels by use of four shock-absorbing devices. The suspension apparatus for a small car is mounted to front and rear axles including wheels and adapted to remove vibration or shock transmitted from the wheels. The suspension apparatus includes a plurality of shock-absorbing devices for absorbing shock or vibration transmitted from the wheels by use of the compressive restoring force of air or gas and the elasticity of tubes, or by use of the absorptive restoring force of oil and the elasticity of tubes.

5 Claims, 10 Drawing Sheets

SUSPENSION APPARATUS

BACKGROUND OF THE INVENTION

1. Field of the Invention

The present invention relates to a suspension apparatus for small cars, and more particularly, to a suspension apparatus which can be used in rear-wheel drive, front-wheel drive, or all-wheel drive type small automobiles, so as to rapidly absorb shock or vibration transmitted from wheels by use of four shock-absorbing devices.

2. Description of the Related Art

In general, cars are transportation means using rotation of wheels, and may be classified into passenger cars, vans, small cars, trucks, buses, etc. The present invention deals with an improved suspension apparatus that is mounted in passenger cars and vans (hereinafter, referred to as "small cars").

Small cars are classified into a rear-wheel drive type designed to achieve a propelling force by transmitting power to rear wheels, a front-wheel drive type designed to achieve a propelling force by transmitting power to front wheels, and an all-wheel drive type designed to achieve a propelling force by transmitting power to front and rear wheels. The suspension apparatus of the present invention is applicable to all the rear-wheel drive, front-wheel drive, and all-wheel drive type small cars.

The suspension apparatus comprises: a spring to absorb and alleviate vibration or shock transmitted from the road surface and tires during traveling; and a shock-absorber to restrict the proper oscillation of the spring so as to achieve excellent driving comfort. In small cars, a coil spring (hereinafter, referred to as a "spring") is widely used as the spring of the suspension apparatus.

As well known, in particular, the suspension apparatus may be classified into a front suspension apparatus and a rear suspension apparatus, on the basis of the mounting position thereof. Some suspension apparatuses comprise only a spring, whereas the remaining suspension apparatuses comprise both a spring and a shock-absorber.

With the provision of the spring, the suspension apparatus can serve to elastically alleviate vibration or shock transmitted from wheels.

However, it should be noted that, although the spring has an advantage of efficiently absorbing heavy vibration or shock transmitted from wheels, the spring tends to generate residual vibration due to an elastic repulsive force thereof after absorption of the heavy vibration or shock.

Consequently, there is a problem in that the residual vibration, generated from the spring after absorption of shock, is directly transmitted to a car body, resulting in a deterioration of driving comfort.

For this reason, the shock-absorber is installed to the lateral side of the spring or inside the spring, for the purpose of removing the residual vibration of the spring. On the basis of structural characteristics thereof, the shock-absorber accomplishes the removal of vibration or shock via movement of a fluid.

The shock-absorber using the flow of a fluid, however, is adapted to absorb vibration or shock gradually, rather than to absorb vibration or shock in an instant. Therefore, the shock-absorber has a problem in that it requires a relatively long time to absorb the residual vibration generated from the spring.

In conclusion, when absorbing the residual vibration of the spring via the movement of a fluid, a somewhat lapse in time is inevitable according to the flow rate of the fluid, therefore a relatively long time is required to absorb the residual vibration. Accordingly, the above described shock-absorber is incapable of rapidly absorbing shock or vibration transmitted from the wheels.

SUMMARY OF THE INVENTION

Therefore, the present invention has been made in view of the above problems, and it is an object of the present invention to provide a suspension apparatus for small cars, which can rapidly and completely absorb shock or vibration transmitted from wheels, and especially, absorb infinitesimal vibration by use the compressive restoring force of air or gas and the elasticity of tubes, or by use of the absorptive restoring force of oil and the elasticity of tubes.

In accordance with an aspect of the present invention, the above and other objects can be accomplished by the provision of a suspension apparatus for a small car, the suspension apparatus being mounted to front and rear axles including wheels and adapted to remove vibration or shock transmitted from the wheels, wherein the suspension apparatus comprises a plurality of shock-absorbing devices for absorbing shock or vibration transmitted from the wheels by use of the compressive restoring force of air or gas and the elasticity of tubes, or by use of the absorptive restoring force of oil and the elasticity of tubes.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, preferred embodiments of the present invention will be described in detail with reference to the accompanying drawings.

Figure 1:
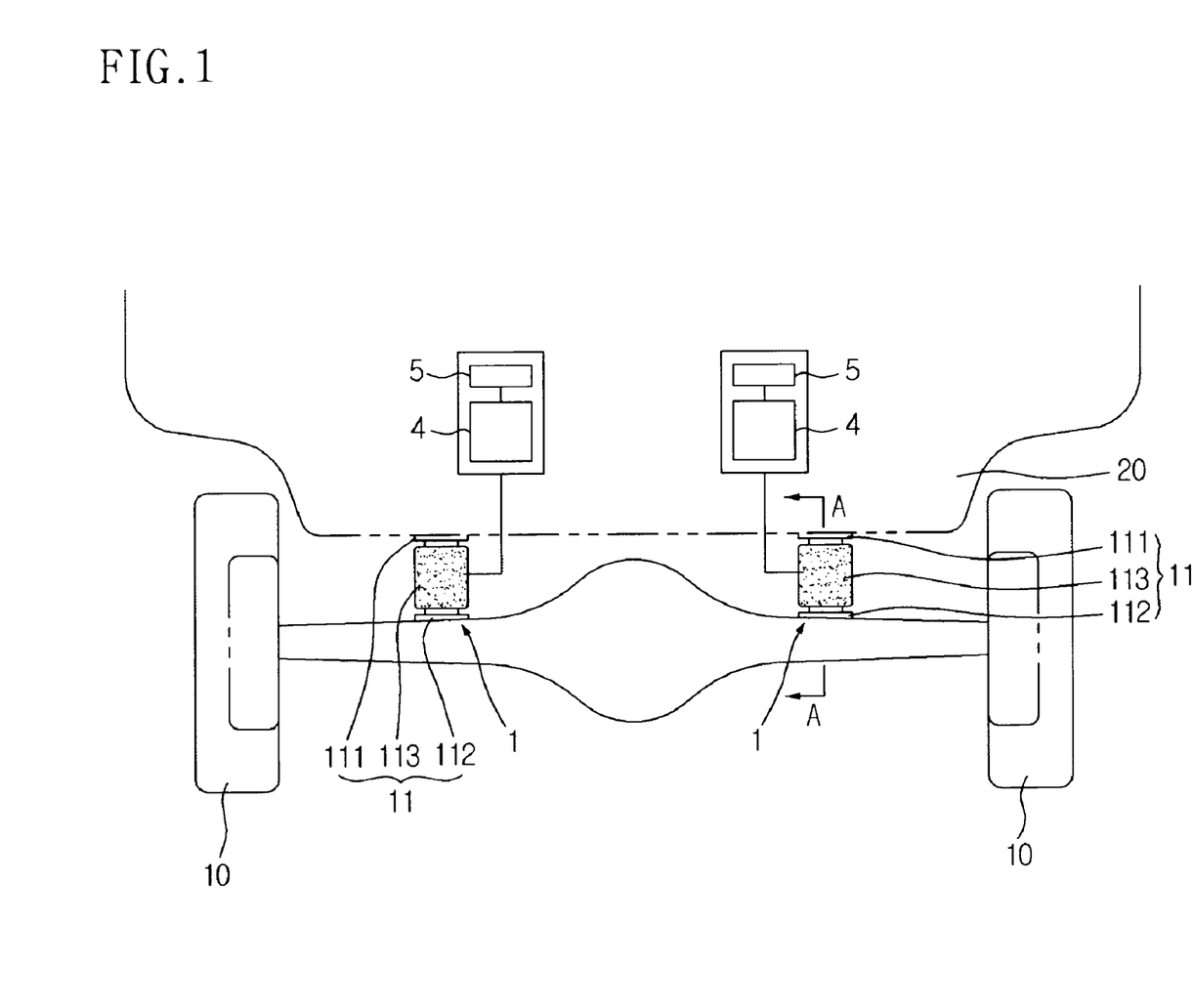
FIG. 1 is a sectional view illustrating a suspension apparatus for small cars according to a first embodiment of the present invention.
Figure 2:
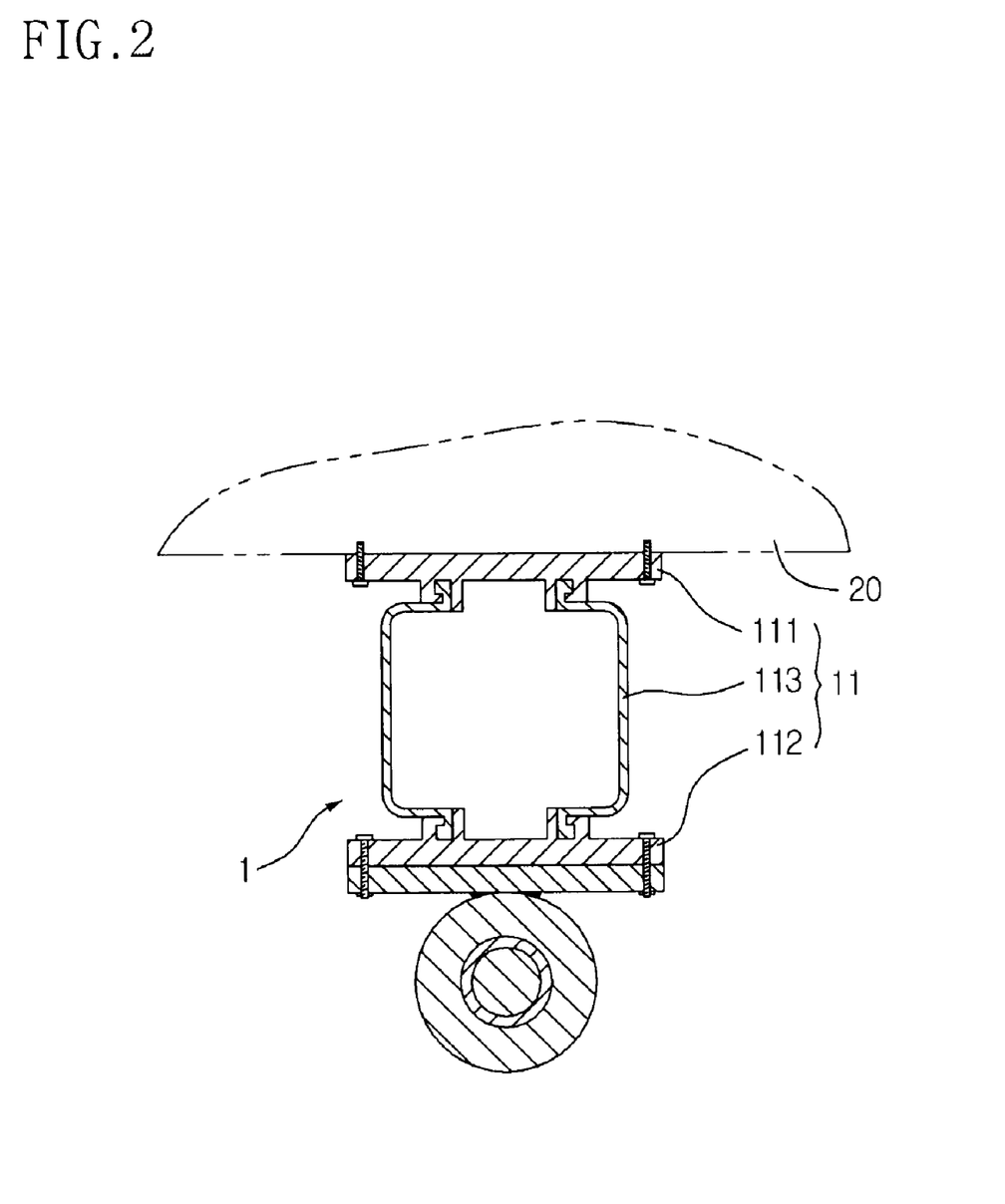
FIG. 2 is a sectional view taken along the line A-A of FIG. 1.

FIG. 1 is a sectional view illustrating a suspension apparatus for small cars according to a first embodiment of the present invention, and FIG. 2 is a sectional view taken along the line A-A of FIG. 1.

The suspension apparatus 1 according to the first embodiment of the present invention is for use in a front-wheel drive type small car designed to achieve a propelling force by transmitting power to front wheels 10, or for use in an all-wheel drive type small car designed to achieve a propelling force by transmitting power to front and rear wheels 10.

The above described front-wheel drive or all-wheel drive type small car includes both front and rear axle housings 2 provided, respectively, at front and rear axles. In this case, the suspension apparatus 1, for use in the front-wheel drive or all-wheel drive type small car, comprises four shock-absorbing devices 11 provided between both side positions of each of the front and rear axle housings 2 and a car body 20.

Each of the shock-absorbing devices 11 serves to absorb and alleviate shock or vibration transmitted from the wheels 10 by use of the compressive restoring force of air or gas and the elasticity of tubes, or by use of the absorptive restoring force of oil and the elasticity of tubes.

In the present embodiment, the shock-absorbing device 11 includes: an upper plate 111 coupled to a lower end of the body 20; a lower plate 112 coupled to an upper end of the axle housing 2; and an elastic tube 113 provided between the upper plate 111 and the lower plate 112, the elastic tube 113 being filled with air, gas, or oil. If shock or vibration are transmitted from the wheels 10 to the shock-absorbing device 11, the elastic tube 113 of the shock-absorbing device 11 is expanded and contracted such that the air, gas, or oil filled in the elastic tube 113 is expanded and compressed. As the expansion and compression of the air, gas, or oil is repeated, the shock-absorbing device 11 can remove shock or vibration transmitted from the wheels 10.

Hereinafter, the operation and effects of the suspension apparatus for small cars according to the first embodiment of the present invention will be described.

As shown in FIGS. 1 and 2, if vibration or shock is transmitted from the wheels 10 to the suspension apparatus during traveling of a small car, the vibration or shock can be absorbed and alleviated by the four shock-absorbing devices 11 provided between the body 20 and the axles. The shock-absorbing devices 11 can act to rapidly and completely absorb various different magnitudes of shock or vibration transmitted to the suspension apparatus, therefore it is possible to improve the traveling safety and the driving comfort of the small car.

More specifically, if vibration or shock are transmitted from the wheels 10 to the shock-absorbing devices 11 constituting the suspension apparatus 1 during traveling, the elastic tubes 113, filled with the air, gas, or oil, are instantaneously compressed and restored. As the instantaneous compression and restoration of the elastic tubes 113 is repeated, the shock or vibration can be absorbed instantaneously.

At the instant when the elastic tubes 113, filled with the air or gas, are compressed and then, restored, a restoring force of the compressed air or gas and a compressive restoring force of the expanded elastic tubes 113 are generated simultaneously, thereby absorbing vibration or shock transmitted from the wheels 10 while preventing any infinitesimal vibration from remaining in the shock-absorbing devices 11.

In conclusion, after the shock-absorbing devices 11 absorb vibration or shock, the restoring force of the air or gas is simultaneously generated with the restoring force of the elastic tubes 113. This has the effect of causing substantially no infinitesimal vibration, thereby previously preventing a deterioration of driving comfort due to the infinitesimal vibration.

On the other hand, at the instant when the elastic tubes 113, filled with the oil, are compressed and then, restored, an absorptive restoring force of the oil and a compressive restoring force of the expanded elastic tubes 113 are generated simultaneously, thereby absorbing vibration or shock transmitted from the wheels 10 while preventing any infinitesimal vibration from remaining in the shock-absorbing devices 11.

In conclusion, after the shock-absorbing devices 11 absorb vibration or shock, the absorptive restoring force of the oil is simultaneously generated with the restoring force of the elastic tubes 113. This has the effect of causing substantially no infinitesimal vibration, thereby previously preventing a deterioration of driving comfort due to the infinitesimal vibration.

When using the shock-absorbing devices 11 including the elastic tubes 113 filled with the fluid, the compressive restoring force of the air or gas and the elasticity of the tubes 113, or the absorptive restoring force of the oil and the elasticity of the tubes 113, can be utilized to absorb shock or vibration transmitted from the wheels 10 without depending on any physical absorption using springs. As a result, the vibration or shock can be rapidly and gently absorbed regardless of the magnitude of vibration or shock transmitted from the wheels 10.

For example, when using the compressive restoring force of the air or gas and the elasticity of the tubes 113, the tubes 113 show a gentle restoration rather than being restored suddenly even if an instantaneous shock is applied thereto. The applied shock can be absorbed rapidly within the tubes. When the air or gas is compressed and then, restored, as described above, there exists substantially no infinitesimal vibration.

When using the absorptive restoring force of the oil and the elasticity of the tubes 113, for example, the tubes 113 show a gentle restoration rather than being restored suddenly even if an instantaneous shock is applied thereto. The applied shock can be absorbed rapidly within the tubes 113. When the elastic tubes 113, filled with the oil, are expanded and compressed, as described above, there exists substantially no infinitesimal vibration under the influence of the absorptive force of the oil.

As shown in FIG. 1, each shock-absorbing device 11 further includes an auxiliary tank 4 communicating with the elastic tube 113, the interior of the auxiliary tank 4 being filled with air such that the air, gas, or oil filled in the elastic tube 113 can be moved into or from the auxiliary tank 4 as the elastic tube 113 is compressed or restored. The shock-absorbing device 11 further includes a compressor 5 to control the injection of air to be filled into the auxiliary tank 4.

The interior of the auxiliary tank 4 is always filled with the air. Accordingly, at the instant when the elastic tube 113 is compressed, the air, gas, or oil filled in the elastic tube 113 is moved into the auxiliary tank 4 to enable the compression of the elastic tube 113.

Conversely, as the air, gas, or oil, moved into the auxiliary tank 4, is again moved into the elastic tube 113 via the expansion of the air filled in the auxiliary tank 4, the elastic tube 113 can restore the original state thereof.

With the compression and restoration of the elastic tube 113, the shock or vibration transmitted from the wheels 10 can be removed.

The compressor 5 serves to inject air into the auxiliary tank 4. The compressor 5 is operable by a controller (not shown) such that the compressor 5 can not only replenish the auxiliary tank 4 with air, but also regulate the pressure of air inside the auxiliary tank 4 for regulating the alleviation degree of shock or vibration.

As a result of removing shock or vibration transmitted from the wheels 10 via the compression and restoration of the elastic tubes 113 as described above, the traveling safety and the driving comfort of small cars can be improved further.

Figure 3:
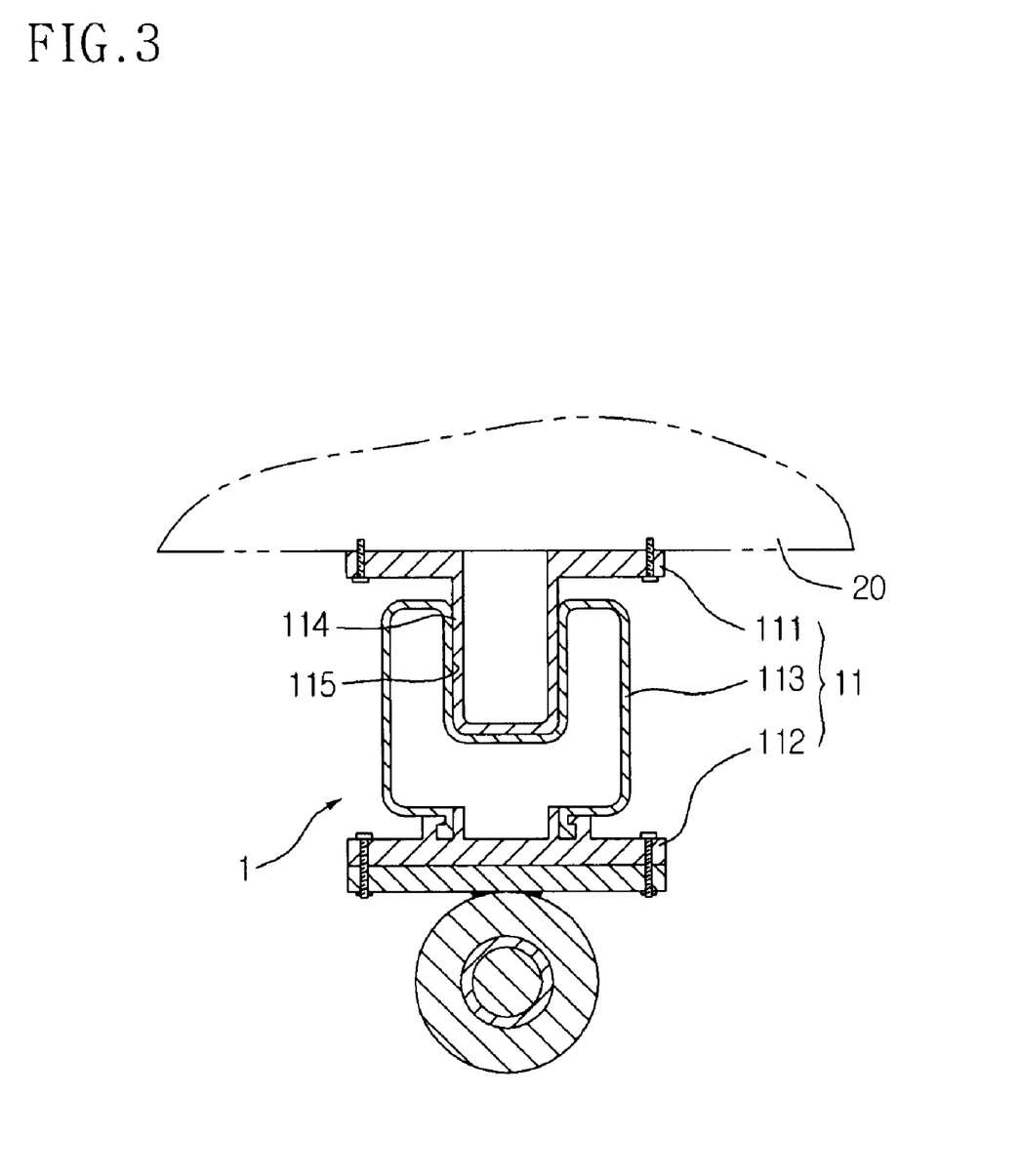
FIG. 3 is a sectional view illustrating an alternative embodiment of a shock-absorbing device included in the suspension apparatus according to the first embodiment of the present invention.

FIG. 3 is a sectional view illustrating an alternative embodiment of the shock-absorbing device included in the suspension apparatus according to the first embodiment of the present invention. In addition to the upper plate 111 coupled to the lower end of the body 20, the lower plate 112 coupled to the upper end of the axle housing 2, and the elastic tube 113 provided between the upper and lower plates 111 and 112 and filled with air, gas, or oil of the above described embodiment, the shock-absorbing device 11 according to the alternative embodiment further includes a lifting member 114 protruding downward from the upper plate 111 in a vertically movable manner, and the elastic tube 113 has a recess 115 configured to allow the lifting member 114 to be vertically moved on an inner periphery of the recess 115.

With this configuration, if vibration or shock is transmitted from the wheels 10, the lifting member 114 is vertically moved along the recess 115 of the elastic tube 113, thereby acting to absorb the vibration or shock.

Figure 4:
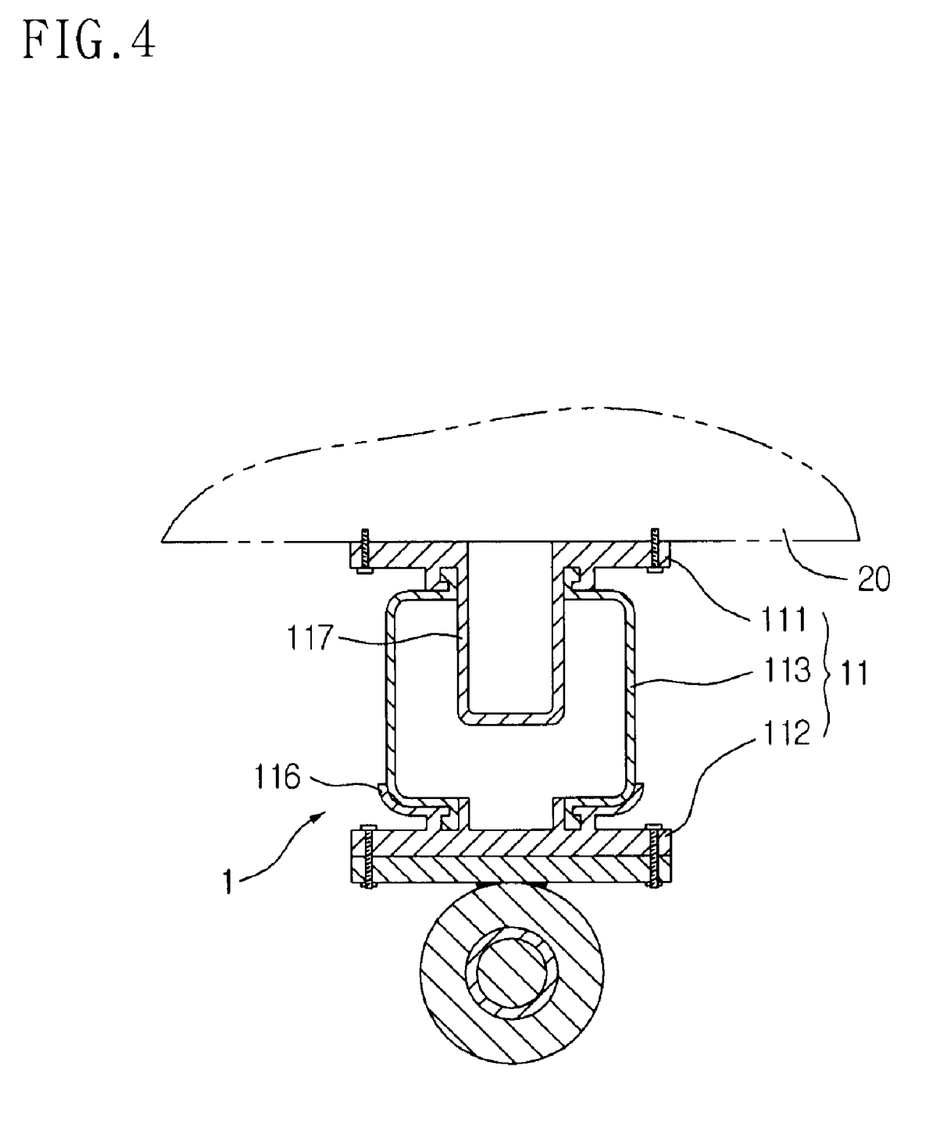
FIG. 4 is a sectional view illustrating another alternative embodiment of the shock-absorbing device included in the suspension apparatus according to the first embodiment of the present invention.

FIG. 4 is a sectional view illustrating another alternative embodiment of the shock-absorbing device included in the suspension apparatus according to the first embodiment of the present invention. In addition to the upper plate 111 coupled to the lower end of the body 20, the lower plate 112 coupled to the upper end of the axle housing 2, and the elastic tube 113 provided between the upper and lower plates 111 and 112 and filled with air, gas, or oil of the above described embodiment, the shock-absorbing device 11 according to the present alternative embodiment further includes: a lower supporting member 116 protruding upward from the lower plate 112 so as to support the bottom of the elastic tube 113; and a lifting member 117 protruding downward from the upper plate 111 and penetrating through the center of the elastic tube 113 so as to be vertically moved in the elastic member 113.

With this configuration, if vibration or shock is transmitted from the wheels 10, the lifting member 117 is vertically moved along the center of the elastic tube 113, thereby acting to absorb the vibration or shock.

Figure 5:
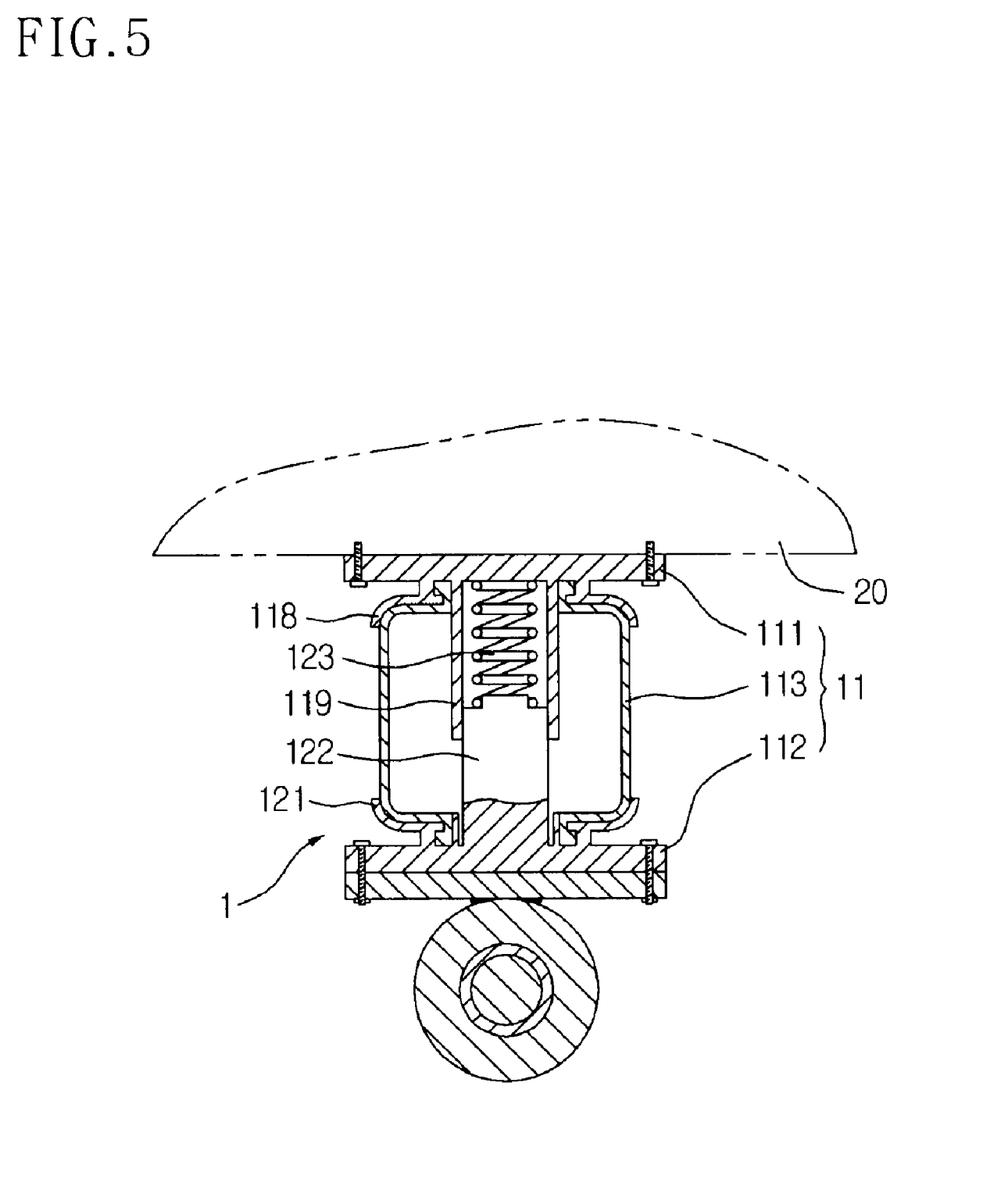
FIG. 5 is a sectional view illustrating yet another alternative embodiment of the shock-absorbing device included in the suspension apparatus according to the first embodiment of the present invention.

FIG. 5 is a sectional view illustrating yet another alternative embodiment of the shock-absorbing device included in the suspension apparatus according to the first embodiment of the present invention. The shock-absorbing device 11 according to the present alternative embodiment includes the upper plate 111 coupled to the lower end of the body 20, the lower plate 112 coupled to the upper end of the axle housing 2, and the elastic tube 113 provided between the upper and lower plates 111 and 112 and filled with air, gas, or oil, in the same manner as the above described first embodiment.

In the present alternative embodiment, the shock-absorbing device 11 further includes: an upper supporting member 118 protruding downward from the upper plate 111 and coupled to an upper end of the elastic tube 113 so as to cover an upper surface of the elastic tube 113; a through-tube 119 protruding downward from the upper plate 111 and penetrating through the center of the elastic tube 113; a lower supporting member 121 protruding upward from the lower plate 112 and coupled to a lower end of the elastic tube 113 so as to cover a lower surface of the elastic tube 113; an extension 122 protruding upward from the lower plate 112 and penetrating through the center of the elastic tube 113; and an auxiliary spring 123 inserted in the through-tube 119 and having a lower end coupled to the top of the extension 122 and an upper end coupled to a lower surface of the upper plate 111.

With this configuration, if vibration or shock is transmitted from the wheels 10, the extension 122 coupled to the auxiliary spring 123 is vertically moved in the through-tube 119 so as to absorb the vibration or shock. It will be appreciated that the configuration of the present alternative embodiment can achieve a further improvement in the absorption of vibration or shock.

Figure 6:
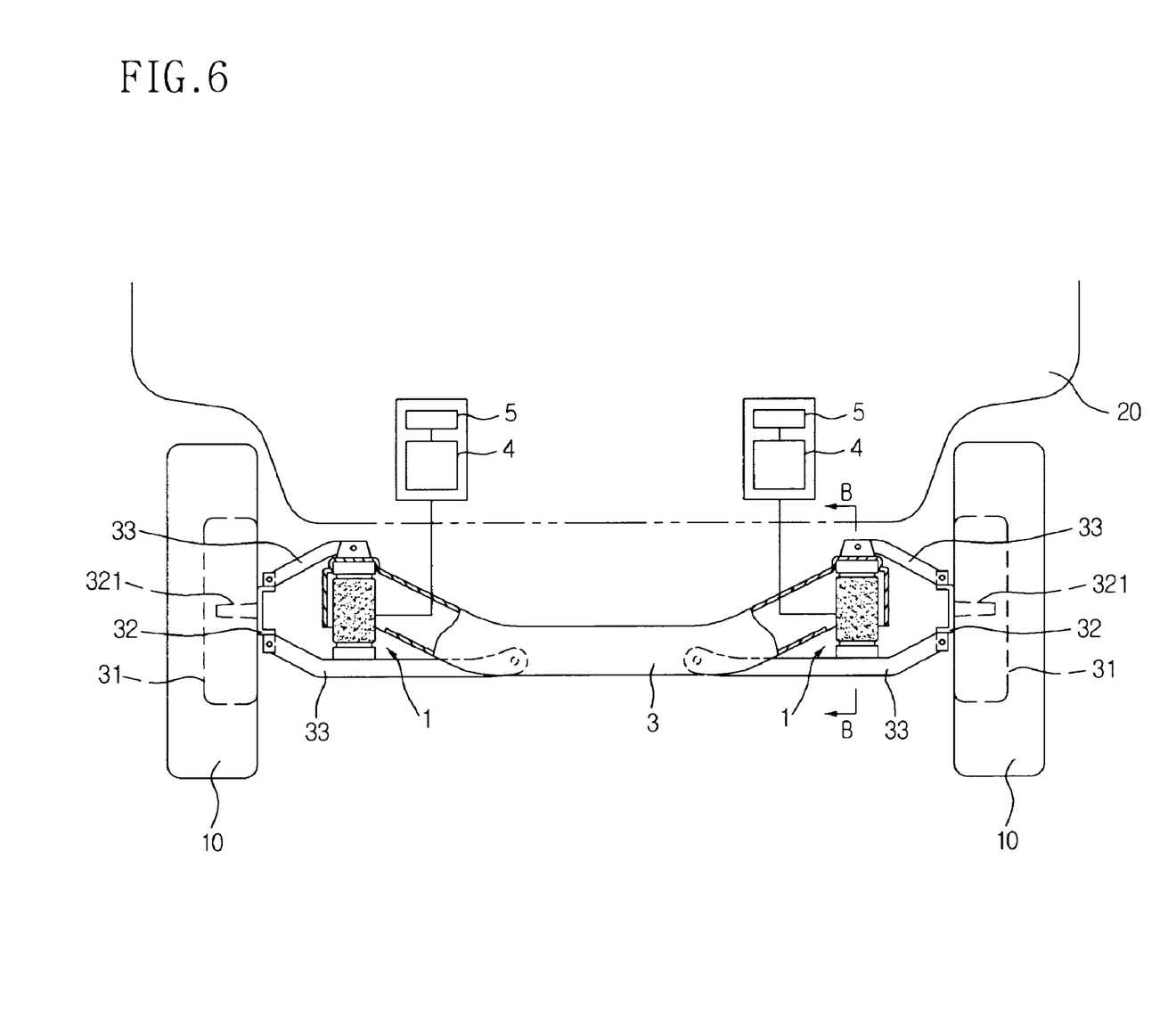
FIG. 6 is a sectional view illustrating a suspension apparatus for small cars according to a second embodiment of the present invention, which is mounted to a front-axle.
Figure 7:
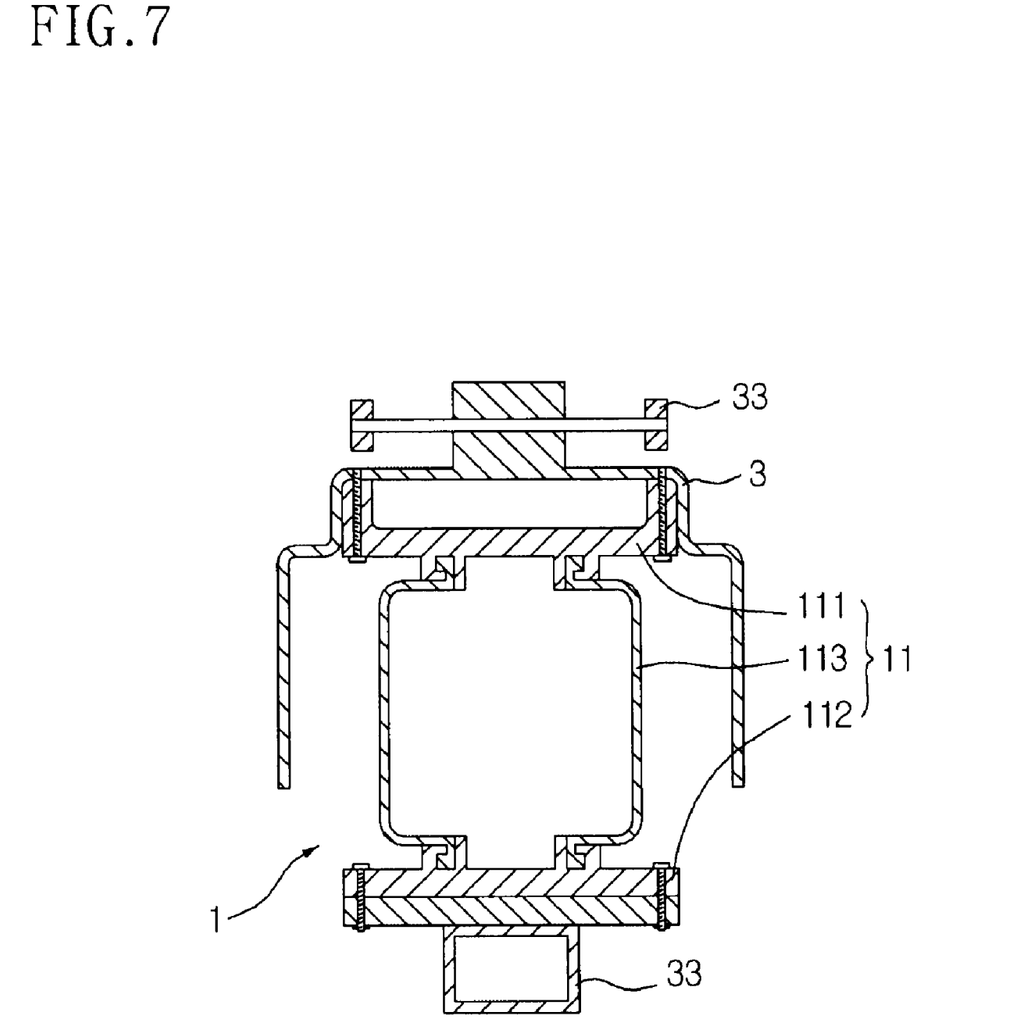
FIG. 7 is a sectional view taken along the line B-B of FIG. 6.

FIG. 6 is a sectional view illustrating a suspension apparatus for small cars according to a second embodiment of the present invention, which is mounted to a front-axle, and FIG. 7 is a sectional view taken along the line B-B of FIG. 6.

The suspension apparatus 1 according to the second embodiment of the present invention is for use in a rear-wheel drive type small car designed to achieve a propelling force by transmitting power to rear wheels 10.

A front axle included in the rear-wheel drive type small car includes: left and right steering knuckles 32, each having a hub 321 connected to an axle frame 3 and a wheel disc 31; and upper and lower suspension arms 33 provided between the axle frame 3 and the left and right steering knuckles 32. A rear axle of the rear-wheel drive type small car includes the axle housing 2.

The suspension apparatus according to the second embodiment of the present invention comprises: two shock-absorbing devices provided between both side positions of a lower end of the axle frame 3 forming the front axle and the lower suspension arms 33 provided at both the sides of the axle frame 3; and two shock-absorbing devices provided between the car body 20 and both ends of the axle housing 2 forming the rear axle.

Each of the shock-absorbing devices 11 provided at the front axle includes the upper plate 111 coupled to the lower end of the axle frame 3, the lower plate 112 coupled to an upper end of the lower suspension arm 33, and the elastic tube 113 provided between the upper plate 111 and the lower plate 112 and filled with air, gas, or oil.

Each of the shock-absorbing devices 11 provided at the rear axle, as shown in FIG. 1, includes the upper plate 111 coupled to the lower end of the body 20, the lower plate 112 coupled to the upper end of the axle housing 2, and the elastic tube 113 provided between the upper and lower plates 111 and 112 and filled with air, gas, or oil. The configuration of the shock-absorbing device 11 for the rear axle is identical to the configuration of that of the above described first embodiment, and thus, a detailed description thereof will be omitted.

Hereinafter, the operation and effects of the suspension apparatus for small cars according to the second embodiment of the present invention will be described.

As shown in FIGS. 6 and 7 and FIG. 1, if vibration or shock is transmitted from the wheels 10 to the suspension apparatus during traveling of a small car, the vibration or shock can be absorbed and alleviated by the four shock-absorbing devices 11 provided between the body 20 and the axles. The shock-absorbing devices 11 can act to rapidly and completely absorb various different magnitudes of shock or vibration transmitted to the suspension apparatus, therefore it is possible to improve the traveling safety and the driving comfort of the small car.

More specifically, if vibration or shock is transmitted from the wheels 10 to the shock-absorbing devices constituting the suspension apparatus during traveling, the elastic tubes 113, filled with the air, gas, or oil, are instantaneously compressed and restored. As the instantaneous compression and restoration of the elastic tubes 113 is repeated, the shock or vibration can be instantaneously absorbed.

At the instant when the elastic tubes 13, filled with the air or gas, are compressed and then, restored, a restoring force of the compressed air or gas and a compressive restoring force of the expanded elastic tubes 13 are generated simultaneously, thereby absorbing vibration or shock transmitted from the wheels 10 while preventing any infinitesimal vibration from remaining in the shock-absorbing devices 11.

In conclusion, after the shock-absorbing devices 11 absorb vibration or shock, the restoring force of the air or gas is simultaneously generated with the restoring force of the elastic tubes 113. This has the effect of causing substantially no infinitesimal vibration, thereby previously preventing a deterioration of driving comfort due to the infinitesimal vibration.

On the other hand, at the instant when the elastic tubes 13, filled with the oil, are compressed and then, restored, an absorptive restoring force of the oil and a compressive restoring force of the expanded elastic tubes 113 are generated simultaneously, thereby absorbing vibration or shock transmitted from the wheels 10 while preventing any infinitesimal vibration from remaining in the shock-absorbing devices 11.

In conclusion, after the shock-absorbing devices 11 absorb vibration or shock, the absorptive restoring force of the oil is simultaneously generated with the restoring force of the elastic tubes 113. This has the effect of causing substantially no infinitesimal vibration, thereby previously preventing a deterioration of driving comfort due to the infinitesimal vibration.

When using the shock-absorbing devices 11 including the elastic tubes 113 filled with the fluid, the compressive restoring force of the air or gas and the elasticity of the tubes 113, or the absorptive restoring force of the oil and the elasticity of the tubes 113 can be utilized to absorb vibration or shock transmitted from the wheels 10 without depending on any physical absorption using springs. As a result, the vibration of shock can be rapidly and gently absorbed regardless of the magnitude of vibration or shock transmitted from the wheels 10.

For example, when using the compressive restoring force of the air or gas and the elasticity of the tubes 113, the tubes 113 show a gentle restoration rather than being restored suddenly even if an instantaneous shock is applied thereto. Thereby, the applied shock can be absorbed rapidly within the tubes 113. Also, when the air or gas is compressed and then, restored, as described above, there exists substantially no infinitesimal vibration.

When using the absorptive restoring force of the oil and the elasticity of the tubes 113, for example, the tubes 113 show a gentle restoration rather than being restored suddenly even if an instantaneous shock is applied thereto. Thereby, the applied shock can be absorbed rapidly within the tubes 113. Also, when the elastic tubes 113, filled with the oil, are expanded and compressed as described above, there exists substantially no infinitesimal vibration under the influence of the absorptive force of the oil.

Figure 8:
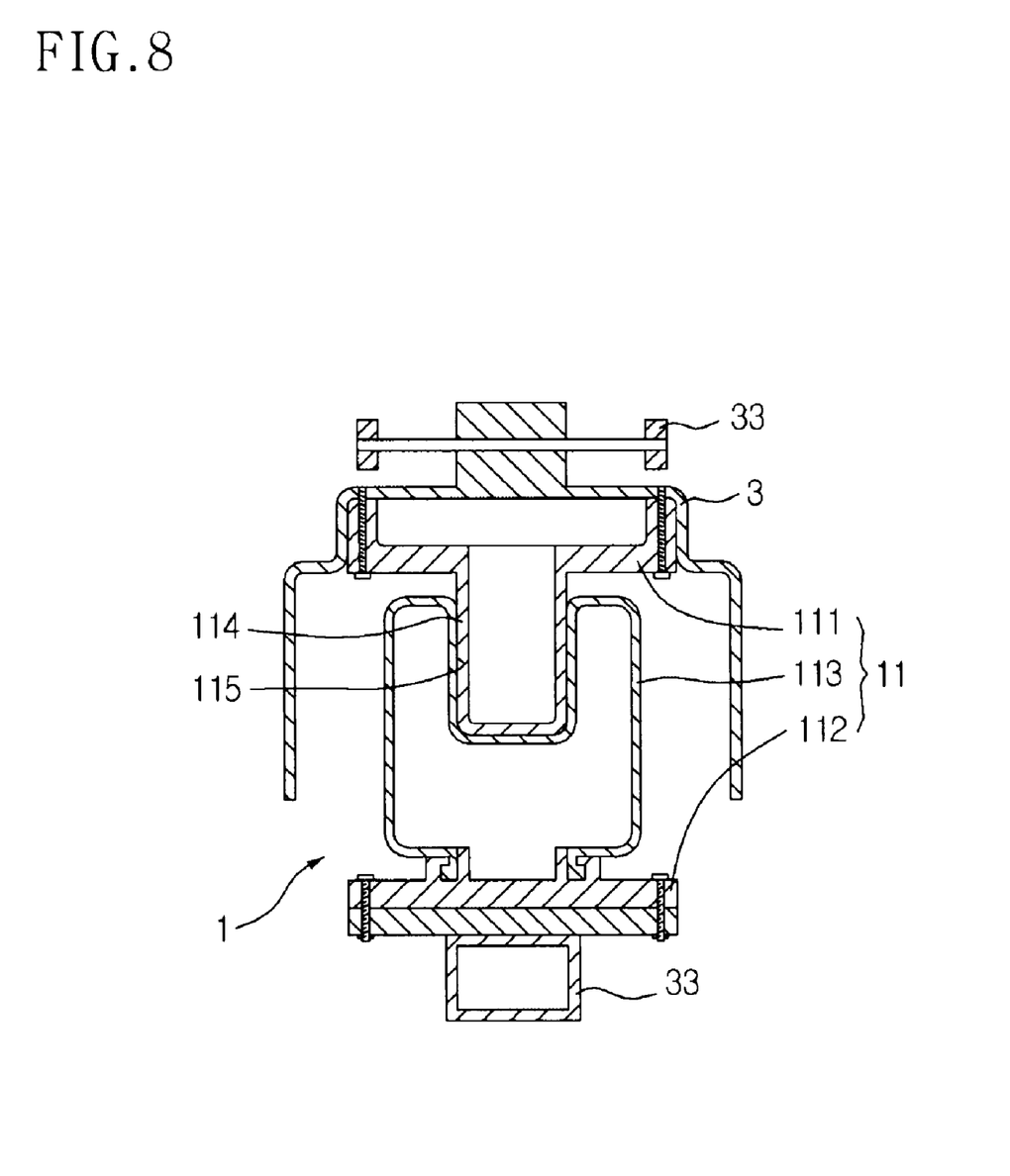
FIG. 8 is a sectional view illustrating an alternative embodiment of a shock-absorbing device mounted to the front axle according to the second embodiment of the present invention.

FIG. 8 is a sectional view illustrating an alternative embodiment of the shock-absorbing device mounted to the front axle according to the second embodiment of the present invention. In addition to the upper plate 111 coupled to the lower end of the axle frame 3, the lower plate 112 coupled to the upper end of the lower suspension arm 33, and the elastic tube 113 provided between the upper plate 111 and the lower plate 112 and filled with air, gas, or oil of the above described embodiment, the shock-absorbing device 11 according to the alternative embodiment further includes the lifting member 114 protruding downward from the upper plate 111 in a vertically movable manner, and the elastic tube 113 has the recess 115 configured to allow the lifting member 114 to be vertically moved on an inner periphery of the recess 115.

With this configuration, if vibration or shock is transmitted from the wheels 10, the lifting member 114 is vertically moved along the recess 115 of the elastic tube 113, thereby acting to absorb the vibration or shock.

Figure 9:
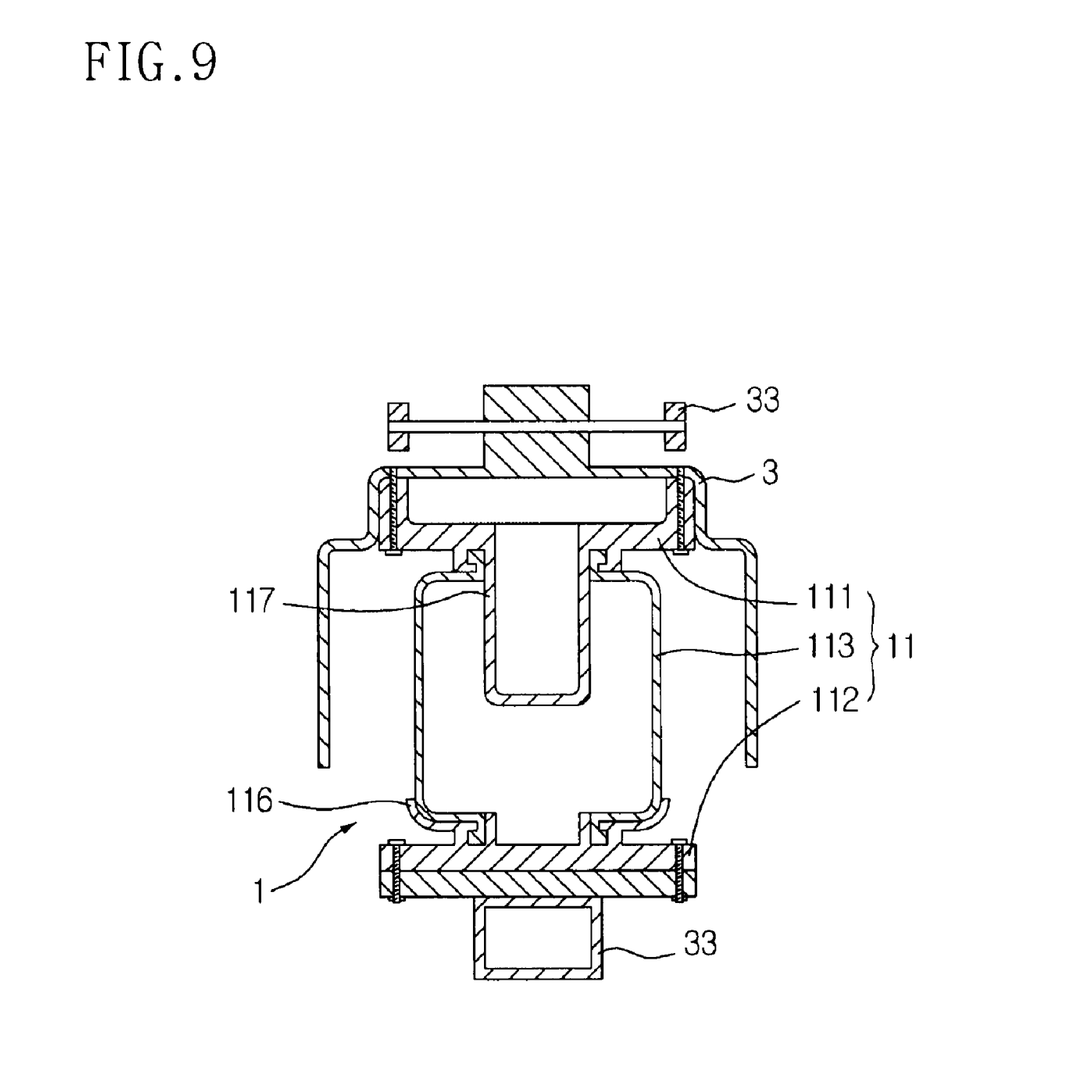
FIG. 9 is a sectional view illustrating another alternative embodiment of the shock-absorbing device mounted to the front axle according to the second embodiment of the present invention.

FIG. 9 is a sectional view illustrating another alternative embodiment of the shock-absorbing device mounted to the front axle according to the second embodiment of the present invention. In addition to the upper plate 111 coupled to the lower end of the axle frame 3, the lower plate 112 coupled to the upper end of the lower suspension arm 33, and the elastic tube 113 provided between the upper and lower plates 111 and 112 and filled with air, gas, or oil of the above described embodiment, the shock-absorbing device 11 according to the present alternative embodiment further includes: the lower supporting member 116 protruding upward from the lower plate 112 so as to support the bottom of the elastic tube 113; and the lifting member 117 protruding downward from the upper plate 111 and penetrating through the center of the elastic tube 113 so as to be vertically moved in the elastic member 113.

With this configuration, if vibration or shock is transmitted from the wheels 10, the lifting member 117 is vertically moved along the center of the elastic tube 113, thereby acting to absorb the vibration or shock.

Figure 10:
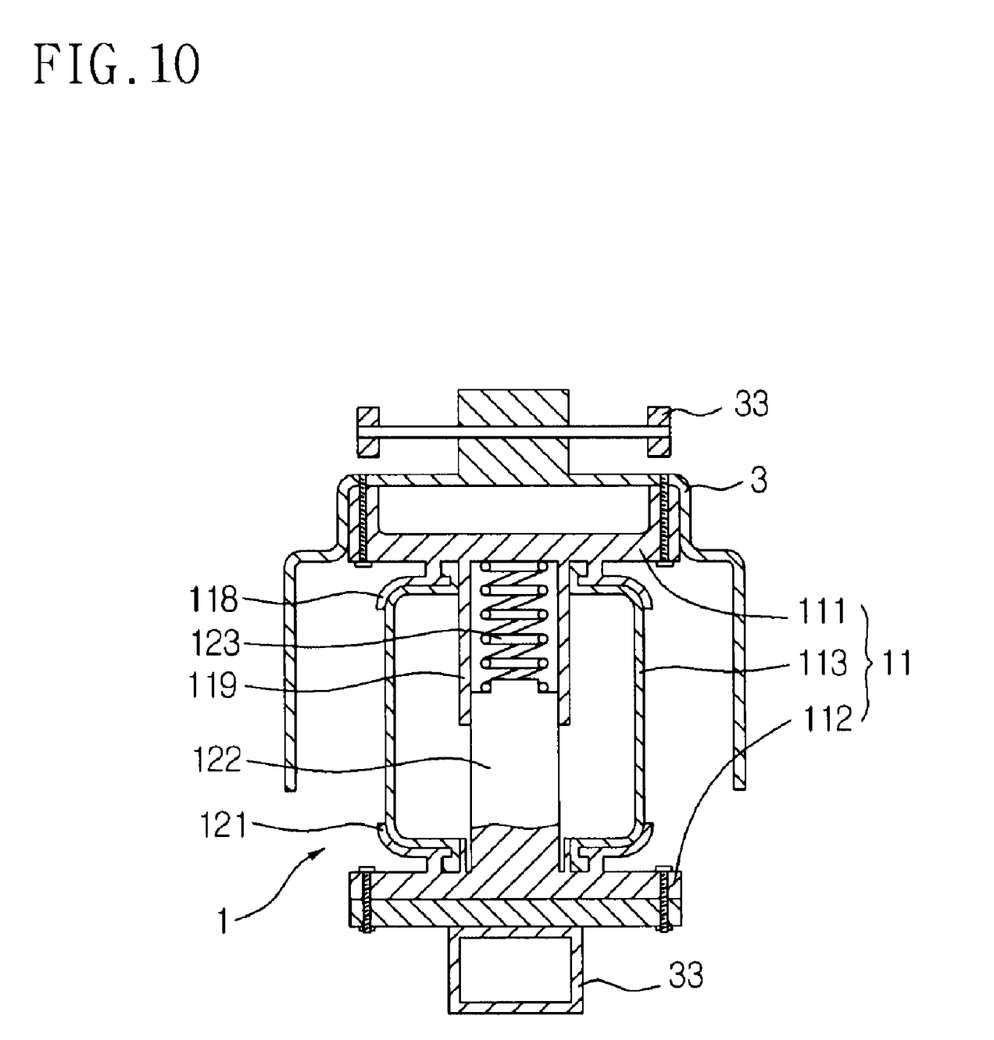
FIG. 10 is a sectional view illustrating yet another alternative embodiment of the shock-absorbing device mounted to the front axle according to the second embodiment of the present invention.

FIG. 10 is a sectional view illustrating yet another alternative embodiment of the shock-absorbing device mounted to the front axle according to the second embodiment of the present invention. The shock-absorbing device 11 according to the present alternative embodiment includes the upper plate 111 coupled to the lower end of the axle frame 3, the lower plate 112 coupled to the upper end of the lower suspension arm 33, and the elastic tube 113 provided between the upper and lower plates 111 and 112 and filled with air, gas, or oil, in the same manner as the above described embodiment.

In the present alternative embodiment, the shock-absorbing device 11 further includes: the upper supporting member 118 protruding downward from the upper plate 111 and coupled to an upper end of the elastic tube 113 so as to cover an upper surface of the elastic tube 113; a through-tube 119 protruding downward from the upper plate 111 and penetrating through the center of the elastic tube 113; a lower supporting member 121 protruding upward from the lower plate 112 and coupled to a lower end of the elastic tube 113 so as to cover a lower surface of the elastic tube 113; the extension 122 protruding upward from the lower plate 112 and penetrating through the center of the elastic tube 113; and the auxiliary spring 123 inserted in the through-tube 119 and having a lower end coupled to the top of the extension 122 and an upper end coupled to a lower surface of the upper plate 111.

With this configuration, if vibration or shock is transmitted from the wheels 10, the extension 122 coupled to the auxiliary spring 123 is vertically moved in the through-tube 119 so as to absorb the vibration or shock. It will be appreciated that the configuration of the present embodiment can achieve a further improvement in the absorption of vibration or shock.

As apparent from the above description, a suspension apparatus of the present invention can rapidly absorb shock or vibration transmitted from wheels and especially, absorb infinitesimal vibration. As a result, the suspension apparatus has the effects of improving the driving comfort of small cars to the maximum extent.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A suspension apparatus for a small car, the suspension apparatus being mounted to front and rear axles including wheels and adapted to remove vibration or shock transmitted from the wheels, wherein, the suspension apparatus comprises a plurality of shock-absorbing devices for absorbing shock or vibration transmitted from the wheels by use of a compressive restoring force of air or gas and elasticity of tubes, or by use of an absorptive restoring force of oil and the elasticity of tubes;

the front and rear axles comprise axle housings, respectively;

the plurality of shock-absorbing devices comprise four shock-absorbing devices provided between both side positions of the axle housings, included in the front and rear axles, and a body of the small car;

each of the shock-absorbing devices comprises: an upper plate coupled to a lower end of the body; a lower plate coupled to an upper end of the associated axle housing; and an elastic tube provided between the upper plate and the lower plate and filled with air, gas, or oil;

the front axle comprises: left and right steering knuckles each having a hub connected to an axle frame and a wheel disc; and upper and lower suspension arms provided between the axle frame and the left and right steering knuckles, and the rear axle comprises an axle housing;

the plurality of shock absorbing devices comprise: two shock absorbing devices between both side positions of a lower end of the axle frame and the lower suspension arms included in the front axle; and two shock-absorbing devices provided between the body and both ends of the axle housing included in the rear axle;

each of the two shock absorbing devices for the front axle comprises: an upper plate coupled to the lower end of the axle frame; a lower plate coupled to an upper end of the associated lower suspension arm, and an elastic tube provided between the upper and lower plates and filled with air, gas, or oil;

each of the two shock-absorbing devices for the rear axle comprises: an upper plate coupled to a lower end of the body, a lower plate coupled to an upper end of the axle housing, and an elastic tube provided between the upper and lower plates and filled with air, gas, or oil.

2. The suspension apparatus according to claim 1, wherein each of the shock-absorbing devices further comprises: an auxiliary tank communicating with the elastic tube, the interior of the auxiliary tank being filled with air such that the air, gas, or oil filled in the associated elastic tube can be moved into or from the auxiliary tank when the elastic tube is compressed or restored; and a compressor to control the injection or discharge of air inside the auxiliary tank.

3. The suspension apparatus according to claim 1, wherein each of the shock-absorbing devices further comprises a lifting member protruding downward from the upper plate in a vertically movable manner, and the elastic tube has a recess configured to allow the lifting member to be vertically moved on an inner periphery of the recess.

4. The suspension apparatus according to claim 1, wherein each of the shock-absorbing devices further comprises:

a lower supporting member protruding upward from the lower plate so as to support the bottom of the elastic tube; and a lifting member protruding downward from the upper plate and penetrating through the center of the elastic tube so as to be vertically moved in the elastic tube.

5. The suspension apparatus according to claim 1, wherein each of the shock-absorbing devices further comprises:

an upper supporting member protruding downward from the upper plate and coupled to an upper end of the elastic tube so as to cover an upper surface of the elastic tube;

a through-tube protruding downward from the upper plate and penetrating through the center of the elastic tube;

a lower supporting member protruding upward from the lower plate and coupled to a lower end of the elastic tube so as to cover a lower surface of the elastic tube;

an extension protruding upward from the lower plate and penetrating through the center of the elastic tube; and an auxiliary spring inserted in the through-tube and having a lower end coupled to the top of the extension and an upper end coupled to a lower surface of the upper plate.

* * * * *